(12) United States Patent
Yamamoto (10) Patent No.: US 6,169,845 B1
(45) Date of Patent: *Jan. 2, 2001

(54) MOVING-IMAGE DATA RECORDING/ REPRODUCING APPARATUS FOR SIMULTANEOUSLY RECORDING/ REPRODUCING A PLURALITY OF MOVING IMAGE DATA ITEMS USING A PLURALITY OF RECORDING/REPRODUCING MEANS

(75) Inventor: Mitsuru Yamamoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/372,876

(22) Filed: Jan. 13, 1995

Related U.S. Application Data (63) Continuation of application No. 08/091,410, filed on Jul. 14, 1993, now abandoned, which is a continuation of application No. 07/553,411, filed on Jul. 17, 1990, now abandoned.

(30) Foreign Application Priority Data

Jul. 26, 1989 (JP) .................................................... 1-191379

(51) Int. Cl.[7] ....................................................... H04N 5/91
(52) U.S. Cl. ............................ 386/92; 358/335; 358/310; 358/342; 358/74; 360/33.1; 360/61; 360/13; 360/14.1; 360/14.2; 360/14.7
(58) Field of Search ................................... 358/335, 310, 358/342, 74; 360/33.1, 61, 13, 14.1, 14.2, 14.7; 386/46, 92, 109, 122, 35, 36, 124, 95, 52; H04N 5/919

(56) References Cited

U.S. PATENT DOCUMENTS

| | | | |
|---|---|---|---|
| 4,450,490 | * 5/1984 | Fujii et al. | 360/13 |
| 4,516,166 | * 5/1985 | Tellone | 360/72.1 |
| 4,577,240 | 3/1986 | Hedberg et al. | |
| 4,873,583 | * 10/1989 | Kobayashi et al. | 358/310 |
| 5,067,029 | * 11/1991 | Takahashi | 358/909 |
| 5,084,789 | * 1/1992 | Kamo et al. | 360/53 |

FOREIGN PATENT DOCUMENTS

| | | |
|---|---|---|
| 3318279 | 11/1984 | (DE). |
| 0113993 | 7/1984 | (EP). |
| 0187073 | 7/1986 | (EP). |
| 2521757 | 8/1983 | (FR). |
| 61-187168 | 8/1986 | (JP). |
| 0114673 | * 7/1993 | (JP). |

OTHER PUBLICATIONS

Proceedings SPIE: Optical Data Storage Meeting, vol. 1078, Jan. 17, 1989, pp. 112–120, Knight et al. "Optical Storage System Architecture".

* cited by examiner

*Primary Examiner*—Robert Chevalier
(74) *Attorney, Agent, or Firm*—Fitzpatrick, Cella, Harper & Scinto

(57) ABSTRACT

A moving-image recording/reproducing apparatus for recording/reproducing a plurality of moving images by using a plurality of moving-image I/O passages includes: a plurality of moving-image recording/reproducing devices and a switch device for selectively establishing a connection between the plurality of moving-image I/O passages and the plurality of moving-image recording/reproducing devices. The apparatus further includes a control device for controlling the switching operation of the switch device, wherein the control device performs the recording/reproducing of the moving images input/output from each of the moving-image I/O passages by allocating the moving images to each of the moving-image recording/reproducing devices in accordance with an instructed sequential order, and controls the switching operation in such a manner that a plurality of the moving-image I/O passages are not allocated concurrently to the same moving-image recording/reproducing device.

34 Claims, 5 Drawing Sheets

| | OUTER PORTION → | | | | ← INNER PORTION |
|---|---|---|---|---|---|
| RECORDING MEDIUM (15) | (41)<br>1, 16 --- | (42)<br>13, 28 --- | (43)<br>4, 19 --- | (44)<br>10, 25 --- | (45)<br>7, 22 --- |
| RECORDING MEDIUM (25) | (46)<br>2, 17 --- | (47)<br>14, 29 --- | (48)<br>5, 20 --- | (49)<br>11, 26 --- | (50)<br>8, 23 --- |
| RECORDING MEDIUM (35) | (51)<br>3, 18 --- | (52)<br>15, 30 --- | (53)<br>6, 21 --- | (54)<br>12, 27 --- | (55)<br>9, 24 --- |

UPPER COLUMN : NUMBERS OF RECORDING REGIONS SHOWN IN FIG. 1

LOWER COLUMN : RECORDING ORDER

FIG. 7

MOVING-IMAGE DATA RECORDING/REPRODUCING APPARATUS FOR SIMULTANEOUSLY RECORDING/REPRODUCING A PLURALITY OF MOVING IMAGE DATA ITEMS USING A PLURALITY OF RECORDING/REPRODUCING MEANS

This application is a continuation of application Ser. No. 08/091,410, filed Jul. 14, 1993 now abandoned, which is a continuation of application Ser. No. 07/553,411, filed Jul. 17, 1990 now abandoned.

BACKGROUND OF THE INVENTION

1. Field of the Invention

The present invention relates to a moving-image recording/reproducing apparatus, and, more particularly, to a moving-image recording/reproducing apparatus capable of simultaneously recording/reproducing data to and from a plurality of video cameras, VTRs, video disks, displays, printers which are I/O means for moving images connected thereto.

2. Description of the Prior Art

Figure 1:
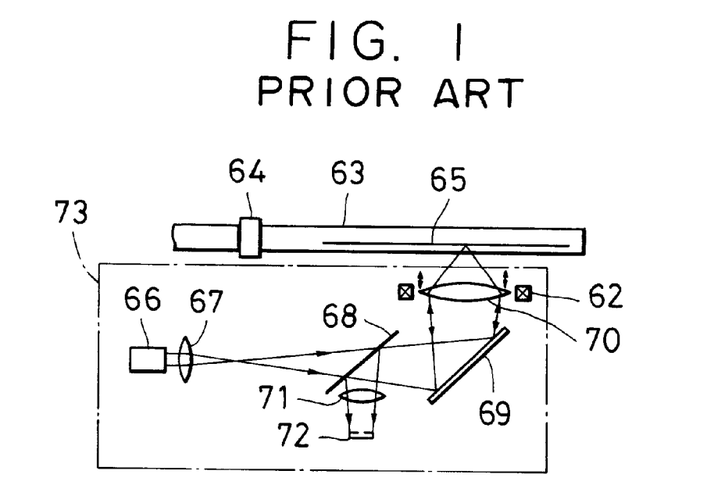
FIG. 1 is structural view which illustrates an optical head portion of a conventional moving-image recording/reproducing apparatus which employs an optical disk.

A variety of moving-image recording/reproducing apparatuses have been developed. For example, a structure which employs an optical disk has been disclosed in Japanese Patent Laid-Open No. 57-78639. According to that disclosure, video signals, audio signals and data signals are, as shown in FIG. 1, recorded on an optical disk, the above-described video, audio and data signals being recorded as optical information (pits) by utilizing the optical permeability, the reflection characteristics, the phase characteristics and the polarization characteristics thereof in spiral or concentric information tracks after the above-described signals have been encoded.

Information recorded on the optical disk is reproduced in such a manner that an optical disk 63 is rotated at, for example, 1800 rpm/minute by a spindle 64 and light emitted from a light source 66 such as a laser is applied to a spiral or concentric information track 65 the optical disk 63 via a lens 67, a half mirror 68, a reflection mirror 69 and an objective lens 70. Then, reflected light from the information track 65 which has been modulated in accordance with optical information is inverted so as to be reflected by the half mirror 68. This reflected light is detected by a light receiving device 72 via a lens 71 so that information is reproduced. In order to make light such as a laser beam accurately follow the information track 65, focusing and tracking error signals are detected from a signal detected by the light receiving device 72. In response to the thus detected focusing and tracking error signals, the objective lens is moved in the focusing or tracking direction by the actuator 62. According to the disclosure, the structure is arranged in such a manner that the above-described optical devices (66 to 72) are supported by an optical head 73 so as to be integrally moved in the radial direction of the optical disk 63. As a result, the information tracks are successively scanned in the radial direction. In the case where information is recorded on the optical disk 63, a structure is employed in which the half mirror 68, the lens 71 and the light receiving device 72 are omitted from the optical system shown in FIG. 1 and a modulator is disposed between the light source 66 and the objective lens 70. Furthermore, light having energy larger than that of the light used at the time of the reproduction operation is emitted from the light source 66, the light having the larger energy being modulated by the modulator in accordance with information to be recorded. The thus modulated light is applied from the inner portion toward the outer portion or from the outer portion toward the inner portion of the optical disk 63. During the moving process, a spiral or concentric information track is formed for each rotation.

When an access to information is made at the time of novel recording or novel reproducing, the optical head 73 is moved in the radial direction by a slider or a linear motor (omitted from the illustration) to a position close to a desired track (rough access). Then, the optical beams are converged onto the subject track (precise access) by using an optical polarizing means (the actuator 62). The time in which the optical head 73 is moved from a certain track to a desired track with performing the rough access and the precise access is called "seeking time". Furthermore, the time taken to seek one-third of all of the tracks is called "average seeking time", the average seeking time usually being several tens of milleseconds (ms).

Figure 2:
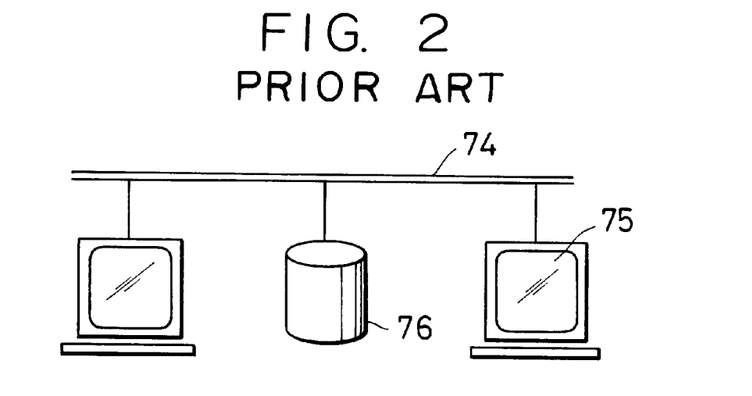
FIGS. 2 and 3 each illustrate a configuration in which the conventional moving-image recording/reproducing apparatus is connected to terminals for displaying the image via communication cables.

The above-described moving-image recording/reproducing apparatuses are widely used in a variety of fields in which moving images are used, such as explanation, education and instruction. In the above-described fields, a moving-image recording/reproducing means 76 is, as shown in FIG. 2, connected to a plurality of terminals 75 for displaying a moving image via a communication cable 74. However, a problem arises in the above-described structure in that, when one moving-image recording/reproduction is performed from any of the plurality of the terminals, another moving-image recording/reproduction to and from the other terminals cannot be conducted. Since the recording/reproduction of the moving image usually takes several minutes or longer, there arises the necessity of a waiting time from start of the recording/reproducing operation performed by a terminal to its completion.

Figure 3:
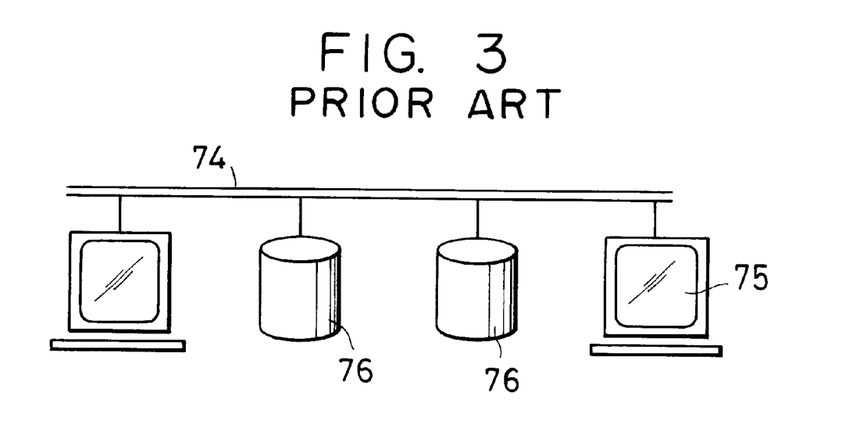

In order to overcome the above-described problem, another control system as shown in FIG. 3 has been disclosed. According to this structure, the same continuous moving-images have been recorded on a plurality of moving image recording/reproducing means 76 and a corresponding moving-image recording/reproducing means is selected from the plurality of terminals. As a result, optional moving-image recording/reproducing operations can be simultaneously performed.

However, according to the above-described structure, a copy of each of the moving images must be recorded on the recording medium of each of the moving-image recording/reproducing means. Therefore, the overall capacity of the recording medium is reduced and the quantity of moving images which can be recorded/reproduced is thereby reduced (due to the overlap, i.e. redundant, recording).

SUMMARY OF THE INVENTION

Accordingly, it is and an object of the present invention to provide a moving-image recording/reproducing apparatus capable of simultaneously recording/reproducing a plurality of moving images, the moving-image recording/reproducing apparatus being arranged in such a manner that the recording medium corresponding to a plurality of moving-image recording/reproducing means does not overlap-record the same moving image so as to utilize the maximum recording capacity thereof.

In order to achieve the above-described object, according to the present invention, there is provided a moving-image recording/reproducing apparatus for recording/reproducing a plurality of moving images by using a plurality of moving-image I/O passages, the moving-image recording/ reproducing apparatus comprising: a plurality of moving-image recording/reproducing means, switch means for selectively establishing a connection between the plurality of moving-image I/O passages and the plurality of moving-image recording/reproducing means, and control means for controlling the switching operation of the switch means, wherein the control means performs the recording/reproducing of the moving images input/output from each of the moving-image I/O passages by allocating the moving images to each of the moving-image recording/reproducing means in accordance with an instructed sequential order and controls the switching operation in such a manner that a plurality of the moving-image I/O passages are not allocated concurrently to the same moving-image recording/reproducing means.

Other and further objects, features and advantages of the invention will be appear more fully from the following description.

DESCRIPTION OF THE PREFERRED EMBODIMENTS

An embodiment of the present invention will now be described with reference to the drawings.

Figures 4A, 4B:
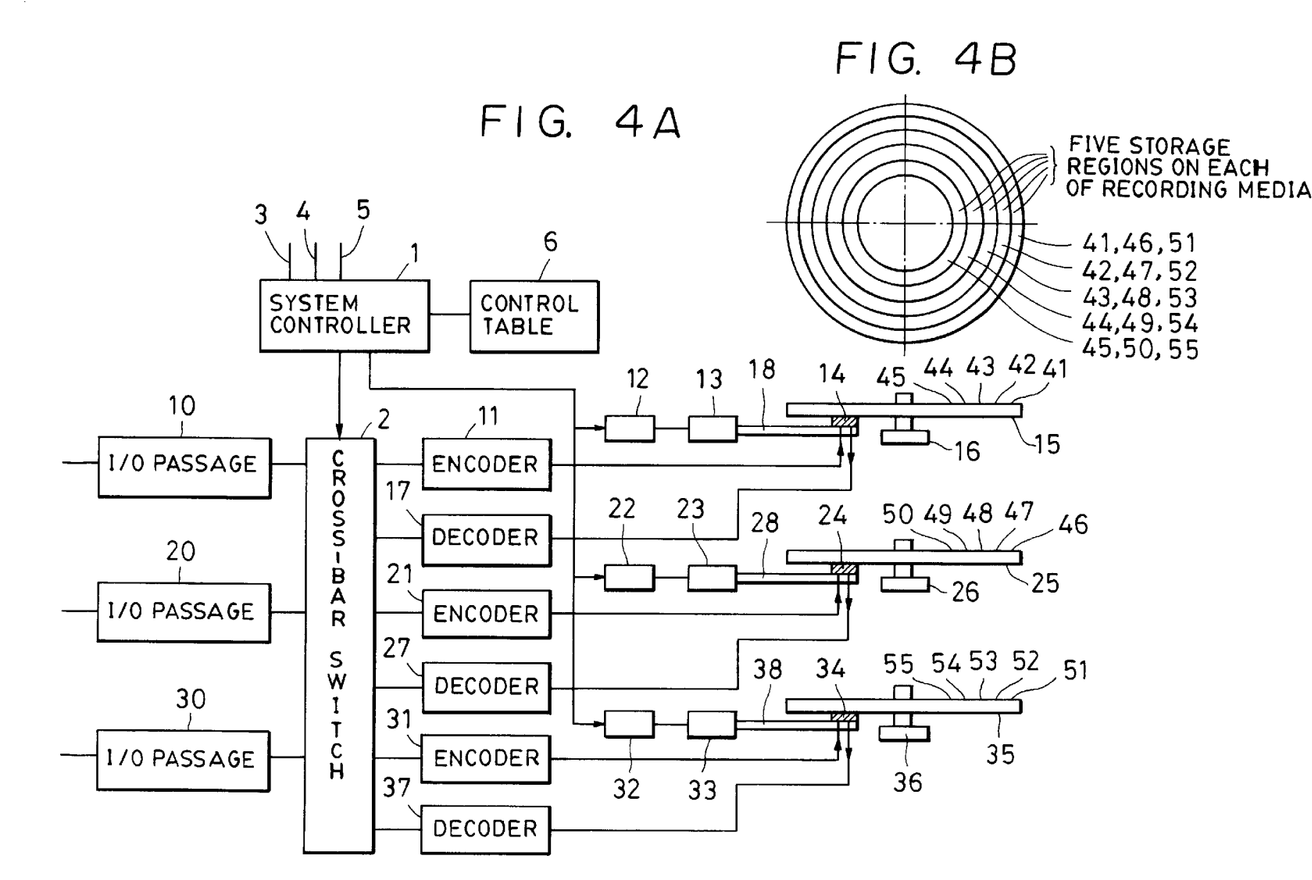
FIG. 4A is a structural view which illustrates an embodiment of the moving-moving image recording/reproducing apparatus according to the present invention.
FIG. 4B is a top illustrative view of recording media in FIG. 4A.

Referring to FIG. 4A, reference numeral 1 represents a system controller (control means) which controls a crossbar switch 2 for switching the connection between I/O passages 10, 20 and 30 for a moving image and optical heads 14, 24 and 34 (structured in the same manner as those shown in FIG. 1) which serve as moving-image recording/reproducing means. Encoders 11, 21 and 31 and decoders 17, 27 and 37 are in parallel disposed between the crossbar switch 2 and the optical heads 14, 24 and 34 for the purpose of converting a moving-image signal and an optical recording signal, respectively. The optical heads 14, 24 and 34 are secured to sliders 18, 28 and 38 so as to move in the radial directions of the optical disks 15, 25 and 35 which serve as recording media (FIG. 4B), the optical heads 14, 24 and 34 being moved by slider motors 13, 23 and 33 so that data is recorded/reproduced from a desired track. The slider motors 13, 23 and 33 are connected to controllers 12, 22 and 32 so as to be operated in response to a control command issued from the system controller 1. The system controller 1 has a control table 6 comprising memory devices. The control table 6 storing the state of use of all of the tracks of each of the optical disks 15, 25 and 35 (empty track information, contents of the moving images recorded on each of the tracks and the like) and the state of use of each of optical heads 14, 24 and 34 {the state of the operation performed by each of the optical heads 14, 24 and 34, e.g. recording mode, reproduction mode or non-operation state, and the address of the region and the track which is being operated). Referring to FIG. 4A, reference numerals 16, 26 and 36 represent motors for operating the optical disks 15, 25 and 35. According to this embodiment, each of the optical disks 15, 25 and 35 is divided into five physical recording regions (from the outer circumference to the inner circumference) 41 to 55 (FIG. 4B).

According to this embodiment, the recording procedure performed by the system controller 1 has been previously set in such a manner that the moving images for a file are successively recorded on the total recording regions (15 regions) on the three optical disks 15, 25 and 35, the moving images being recorded in image units for one image. When the image recording on the first 15 recording regions has been completed, the recording operation returns to the first recording regions and recording on the empty tracks is performed. In this case, the optical heads 14, 24 and 34 are so controlled that they complete the accesses in a predetermined seeking time.

Figure 5:
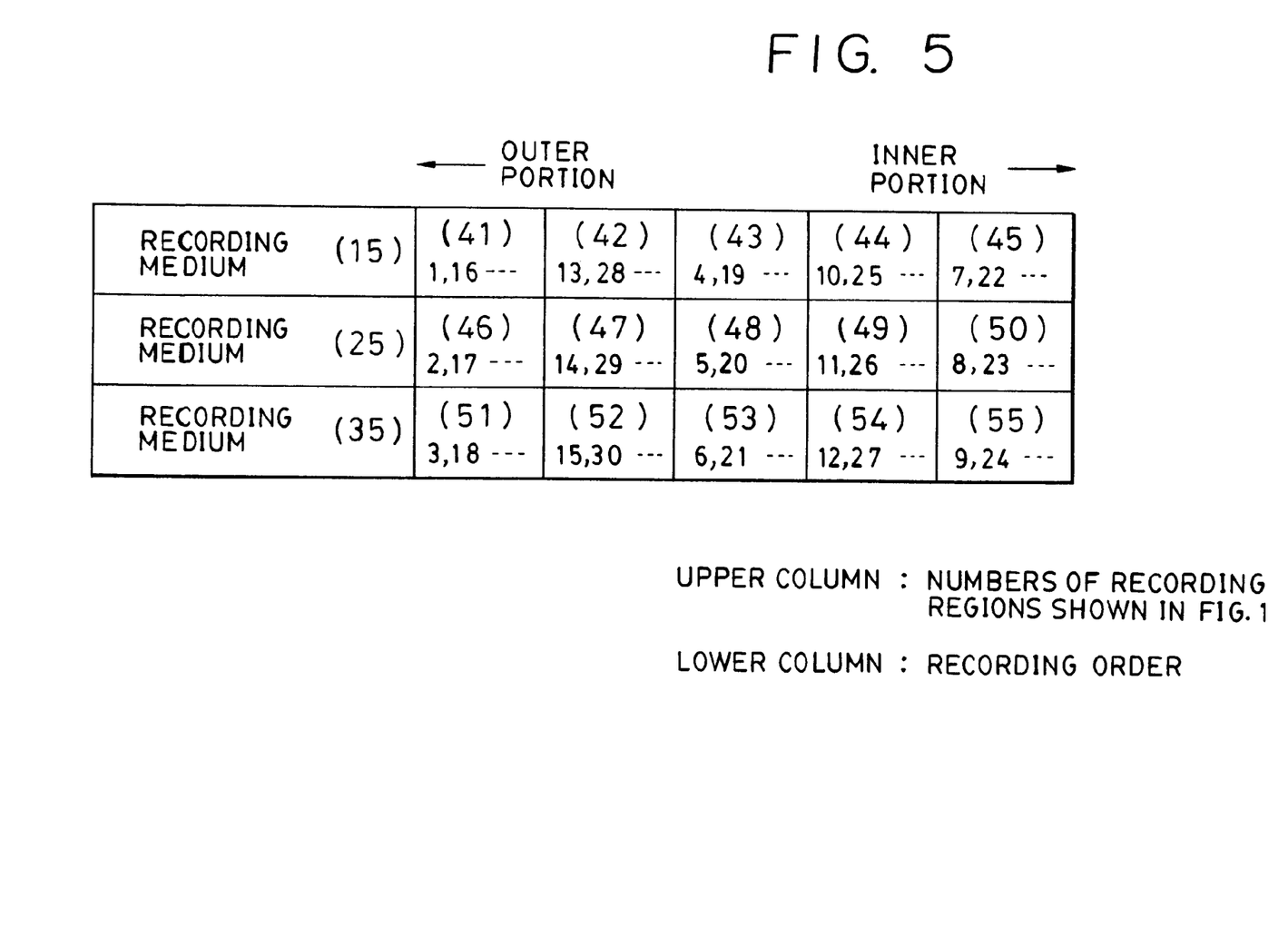
FIG. 5 illustrates the state of the recording regions and set recording sequncy in each of the recording media shown in FIGS. 4A and 4B.
Figure 6:
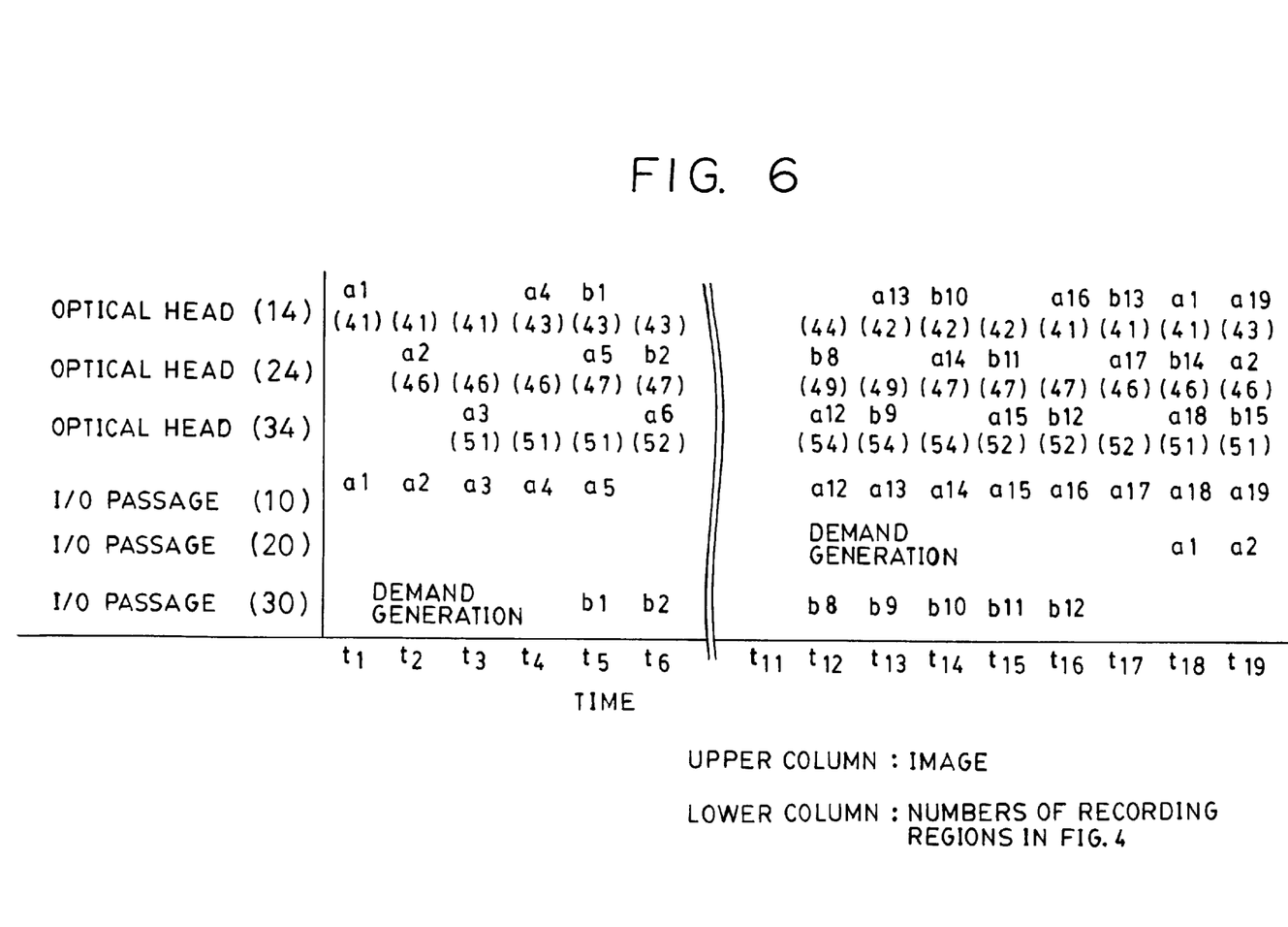
FIG. 6 illustrates the operations of each of the optical heads and I/O passages on a time table for the apparatus shown in FIG. 4A.

The operation will be described with reference to FIGS. 5 and 6, the description being made about a case in which the I/O passage 20 is commanded to reproduce moving image A during a reproduction of the same moving image A through the I/O passage 10, and the I/O passage 30 performs a recording of moving image B. Referring to the drawings, symbols $a_i$ and $b_i$ represent the i-th image unit of the moving image A and that of the moving image B respectively.

When the system controller 1 receives a record/reproduce signal 3 to be supplied to the I/O passage 10, the system controller 1 switches the crossbar switch 2 so as to establish a connection between the I/O passage 10 and the decoder 17. Furthermore, the system controller 1 makes reference to the control table 6 so as to retrieve the track on which first image unit $a_1$ of the moving image A has been recorded. As a result, the system controller 1 transmits a signal, which represents a command to move the optical head 14, to the controller 12. The controller 12 controls the slide motor 13 so as to move the optical head 14 to a desired track. Then, the optical head 14 reads a desired recording signal, the signal then being converted into a desired image signal by the decoder 17. As a result, the first image unit of the moving image A is transmitted from the I/O passage 10 via the crossbar switch 2. The controller 1 then switches the crossbar switch 2 so as to establish a connection between the I/O passage 10 and the decoder 27. Then, the system controller 1 makes reference to the control table 6 so as to retrieve the track on which second image unit $a_2$ of the moving image A has been recorded. As a result, the system controller 1 transmits a signal, which represents a command to move the optical head 24, to the controller 22. The controller 22 controls the slide motor 23 so as to move the optical head 24 to a desired track. A recording signal thus read out is converted by the decoder 27 into an image signal so as to be transmitted as a reproduction signal from the I/O passage via the crossbar switch 2. As described above, the system controller 1 switches the I/O passage 10 to the decoders 17, 27, 37 in accordance with a predetermined sequence and reads out the recording signal from each of the recording regions of the optical disks 15, 25 and 35 in accordance with the contents of the control table 6. As a result, reproduction signals for the moving image A are successively transmitted through the I/O passage 10.

When a command to record image signal B through the I/O passage 30 is, in the form of a record/reproduction signal 5, supplied to the system controller 1 at a time $t_3$ during the above-described reproduction of the moving image A, the system controller 1 retrieves the control table 6 and detects that the optical head 14 does not reproduce the image unit ($a_5$) of the moving image A which is reproduced at time $t_5$. Furthermore, it detects that reproduction from a third recording region 43 has been performed at previous time $t_4$. As a result, the system controller 1 retrieves an empty track in the third recording region 43 from the control table 6 so as to record the first image unit $b_1$ of the moving image B on the third recording region 43 of the optical disk 15. As the same time, the information concerning the thus retrieved track in the control table 6 is changed from information representing "an empty track" to information representing the contents to be recorded on the retrieved track. Furthermore, the system controller 1 moves the optical head 14 to the retrieved empty track via the controller 12 and simultaneously it switches the crossbar switch 2 so as to establish a connection between the I/O passage 30 and the encoder 11 at the time $t_5$. Then, the image unit $b_1$ is converted into an optical recording signal by the encoder 11 so that it is recorded on the retrieved track by the optical head 14. At the time $t_5$, the fifth image unit $a_5$ of the moving image A is reproduced by the optical head 24 and the first image unit $b_1$ of the moving image B is recorded by the optical head 24. Then, the system controller 1 switches the crossbar switch 2 so as to establish a connection between the I/O passage 10 and the decoder 37 and between the I/O passage 30 and the encoder 21. Simultaneously, the system controller 1 retrieves the control table 6 (every time when information is recorded on a track, the information concerning this track is changed to represent the recorded contents) so as to move the optical heads 24 and 34 to a desired track so that the recording signal is reproduced/recorded. Then, the recording/reproducing of the moving images A and B is similarly and in parallel performed.

When a command for reproduction of the moving image A, which is already being reproduced through the I/O passage 10, through the I/O passage 20 is, in the form of the recording/reproducing signal 4, supplied to the system controller 1 at a time $t_{12}$, the system controller 1 retrieves the control table 6 so that the fact that the moving image A is being reproduced is detected. Furthermore, the additional fact is detected that the optical head 14 will perform, at a time $t_{17}$, recording in the recording region in which the first image unit al of the moving image A is recorded, that is, the recording region 41 of the optical disk 15. A still further fact is detected that the optical head 14 will not perform recording/reproducing at time $t_{18}$. As a result, the system controller 1 switches the crossbar switch 2 so as to establish a connection between the I/O passage 20 and the decoder 17 at the time $t_{18}$. At this time, the I/O passage 10 has been connected to the decoder 37, while the I/O passage 30 has been connected to the encoder 21 so as to be used for recording/reproducing image units $a_{18}$ and $b_{14}$. Then, parallel recording/reproducing is performed in which the moving image A is reproduced through the I/O passages 10 and 20 and the moving image B is recorded through the I/O passage 30.

As shown in FIG. 4B, according to this embodiment, the structure is arranged in such a manner that each of the optical disks 15, 25 and 35 is divided into 5 recording regions and the recording operation is moved to the next recording region after one operation of the recording/reproducing from all of the three I/O passages 10, 20 and 30 has been completed. Furthermore, the moving order to the recording regions is, for example, arranged in such a manner that the optical head 14 records/reproduces the optical disk 15 by circulating the five recording regions of the optical disk 15 in a sequential order: the recording region 41, the recording region 43, the recording region 45, the recording region 44, the recording region 42 and the recording region 41.

The optical head 14 reproduces the track having image unit al on the recording region 41 at the time $t_{18}$, and then it reproduces the track having image unit $a_{19}$ on the recording region 43 at time $t_{19}$. When the track having image unit $a_1$ is positioned at the outermost position of the recording region 41 and the track having image unit $a_{19}$ is positioned at the innermost position of the recording region 43, the distance between these tracks becomes 3T−1 assuming that the number of the tracks in each of the recording regions is T. Therefore, the optical head 14 is able to complete its access for the next recording/producing within the seeking time in the above-described recording manner by setting T to be one half or less, preferably one-third, of the number M of tracks which can be sought by the optical head in the non-image signal period (called "a vertical blanking" in an ordinary moving image) of the moving-image signal, where the number M is thus the number of tracks which can be sought by an actuator 62 for use in precise accessing in the above-described period.

Figure 7:
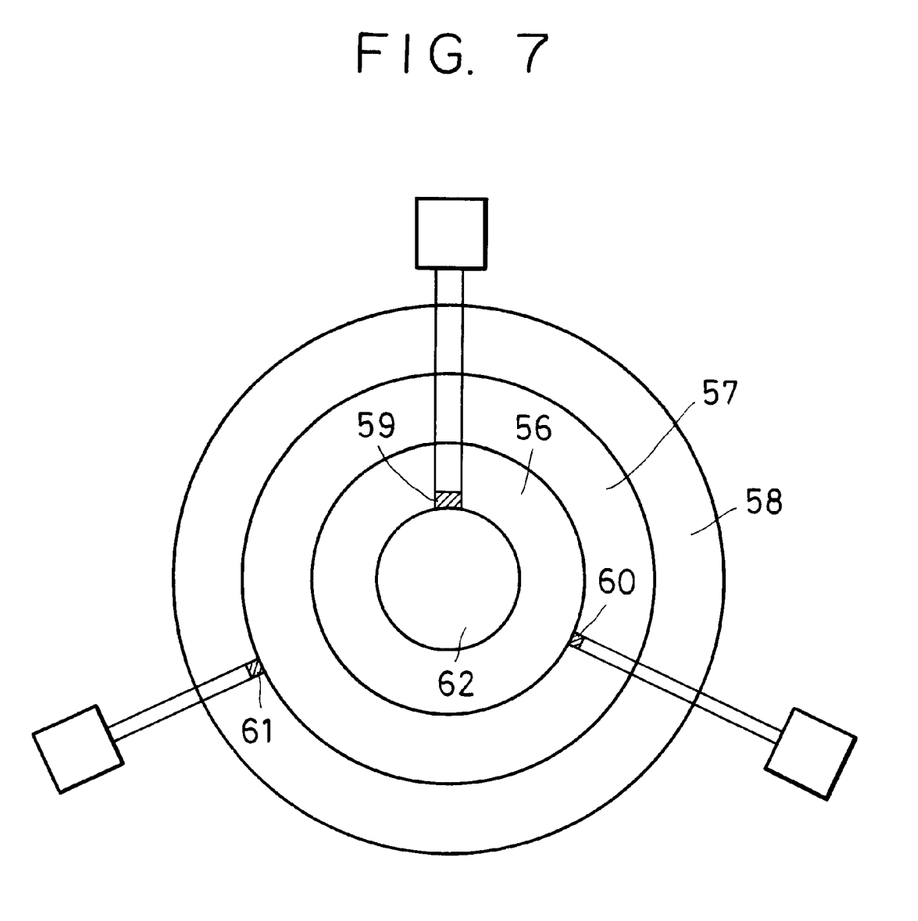
FIG. 7 illustrates another embodiment of the moving-image recording/reproducing apparatus according to the present invention.

FIG. 7 illustrates the arrangement of optical heads 59, 60 and 61 according to another embodiment of the present invention. According to this embodiment, an optical head 62 is provided so as to serve as a sole recording means. Furthermore, the recording region is divided into three exclusive regions: an inner portion 56, a central portion 57 and an outer portion 58 to which the optical heads 59, 60 and 61 are arranged to exclusively perform the recording/reproducing to and from the corresponding portions. The above-described regions 56, 57 and 58 are each, similarly to the optical disks shown in FIG. 4B, divided into, for example, 5 recording regions. Therefore, similarly to the case in which the recording media correspond to the optical heads (see FIG. 4A), the recording/reproducing can be conducted in parallel with each of the I/O passages.

Although the invention has been described in its preferred forms with a certain degree of particularly, it is understood that the preferred forms may be changed in the details of construction and other combinations and arrangements of parts may be resorted to without departing from the spirit and the scope of the invention as hereinafter claimed.

What is claimed is:

1. A method of reading out time-sequenced data from a system, in which the data is formed of a series of a plurality of units that are divided and recorded in a plurality of memories and the data is reproduced by selectively connecting the plurality of memories to a plurality of input-output passages, including first and second input-output passages, via a cross bar switch, said method comprising the steps of:

(a) reading out a first unit of data via the cross bar switch from the first memory to the first input-output passage;

(b) after said step (a), reading out a unit of data other than the first unit of data via the cross bar switch from a memory other than the first memory to the first input-output passage; and (c) during at least a part of a period of said step (b), reading out the first unit of data via the cross bar switch from the first memory to the second input-output passage.

2. A method according to claim 1, wherein the data is formed of moving-image information.

3. A method according to claim 2, wherein each unit of the data is respectively formed of a unit of moving-image information.

4. A method according to claim 1, wherein each respective memory is formed of a recording medium and an information reproduction apparatus for reproducing information from the recording medium.

5. A method according to claim 4, wherein the recording medium is formed of an optical disk.

6. A method according to claim 1, wherein the plurality of memories is formed of a plurality of recording areas, provided on a single recording medium, and a plurality of heads, respectively provided in correspondence with the plurality of recording areas, for reproducing information respectively recorded in each of the plurality of recording areas.

7. A method according to claim 6, where the recording medium is formed of an optical disk in which the plurality of recording areas is concentric.

8. A method according to claim 1, wherein the system comprises n memories (n representing a integer greater than 2) including at least the first memory and a second memory, and, if each unit of the data represents $a_i$, with a recording order corresponding to i, then $a_1\ a_{n+2}, a_{2n+1}, \ldots$ are recorded in the first memory and $a_2, a_{n+2}, a_{2n+2}, \ldots$ are recorded in the second memory.

9. A memory system comprising:
a plurality of memories in which time-sequenced data formed of a series of a plurality of units is divided and recorded, wherein a first unit of the data is recorded in a first memory of said plurality of memories;
a plurality of input-output passages including at least first and second input-output passages;
a cross bar switch for selectively connecting said plurality of memories and said plurality of input-output passages; and
a controller for controlling said cross bar switch, wherein said controller:
(a) connects the first memory and the first input-output passage with said cross bar switch in order to read out the first unit of the data from the first memory,
(b) connects a memory other than the first memory and the first input-output passage with said cross bar switch in order to read out a unit other than the first unit of the data, after completing (a), and
(c) connects the first memory and the second input-output passage with said cross bar switch in order to read out the first unit of data during a part of a period for performing (b).

10. A memory system according to claim 9, wherein the data is formed of moving-image formation.

11. A memory system according to claim 10, wherein each unit of the data is respectively formed of a unit of moving-image information.

12. A memory system according to claim 9, wherein each respective memory is formed of a recording medium and an information reproduction apparatus for reproducing information from the recording medium.

13. A memory system according to claim 12, wherein the recording medium is formed of an optical disc.

14. A memory system according to claim 9, wherein said plurality of memories is formed of a plurality of recording areas provided on a single recording medium and a plurality of heads, respectively provided in correspondence with the plurality of recording areas, for reproducing information respectively recorded in each of the plurality of recording areas.

15. A memory system according to claim 14, wherein the recording medium is formed of an optical disk in which the plurality of recording areas is concentric.

16. A memory system according to claim 9, further comprising n memories (n representing an integer greater than 2) including at least the first memory and a second memory, and, if each unit of the data represents $a_i$, with a recording order corresponding to i, then $a_1\ a_{n+2}, a_{2n+1}, \ldots$ are recorded in the first memory and $a_2, a_{n+2}, a_{2n+2}, \ldots$ are recorded in the second memory.

17. A method used in a memory system, for reading out a first time-sequenced data and writing a second time-sequenced data formed of a series of plurality of units, the first data being formed of a series of plurality of units that are divided and recorded in a plurality of memories and a first unit of the first data being recorded in a first memory of the plurality of memories, wherein the plurality of memories is connected to a plurality of input-output passages that include first and second input-output passages via a cross bar switch, said method comprising the steps of:
(a) reading the first unit of the first data from the first memory out to the first input-output passage via the cross bar switch;
(b) reading a unit of data from a memory other than the first memory out to the first input-output passage via the cross bar switch after said step (a); and
(c) during at least a part of said step (b), writing a first unit of the second data from the second input-output passage in the first memory via the cross bar switch.

18. A method according to claim 17, wherein the first and second data are formed of moving-image formation.

19. A method according to claim 18, wherein each unit of the first and second data is respectively formed of a unit of moving-image information.

20. A method according to claim 17, wherein each respective memory is formed of a recording medium and an information reproduction apparatus for reproducing information from the recording medium.

21. A method according to claim 20, wherein the recording medium is formed of an optical disc.

22. A method according to claim 17, wherein the plurality of memories is formed of a plurality of recording areas provided on a single recording medium and a plurality of heads, respectively provided in correspondence with the plurality of recording areas, for reproducing information respectively recorded in each of the plurality of recording areas.

23. A method according to claim 22, wherein the recording medium is formed of an optical disc in which the plurality of recording areas is concentric.

24. A method according to claim 17, wherein the system has n memories (n representing an integer greater than 2) including at least the first memory and a second memory, and, if each unit of the data represents $a_i$, with a recording order corresponding to i, then $a_1\ a_{n+2}, a_{2n+1}, \ldots$ are recorded in the first memory and $a_2, a_{n+2}, a_{2n+2}, \ldots$ are recorded in the second memory.

25. A method according to claim 24, wherein, if each unit of the second data represents $b_i$, with a recording order corresponding to i, then $b_1\ b_{n+2}, b_{2n+1}, \ldots$ are written in the fist memory from the second input-output passage via the cross bar switch and $b_2, b_{n+2}, b_{2n+2}, \ldots$ are written in the second memory from the second input-output passage via the cross bar switch.

26. A memory system comprising:
a plurality of memories in which time-sequenced data formed of a series of a plurality of units is divided and recorded, wherein a first unit of a first data is recorded in a first memory of the plurality of memories;

a plurality of input-output passages including at least first and second input-output passages;

a cross bar switch for selectively connecting said plurality of memories and said plurality of input-output passages; and a controller for controlling said cross bar switch, wherein said controller:

(a) connects the first memory and the first input-output passage with said cross bar switch in order to read out the first unit of the first data from the first memory, (b) connects a memory other than the first memory and the first input-output passage with said cross bar switch in order to read out a unit of data other than the first unit of data after completing (a), and (c) during a period for performing (b), connecting the first memory and the second input-output passage with said cross bar switch in order to write a first unit of a second data.

27. A memory system according to claim 26, wherein the first and second data are formed of moving-image information.

28. A memory system according to claim 27, wherein each unit of the first and second data is respectively formed of a unit of moving-image information.

29. A memory system according to claim 26, wherein each respective memory is formed of a recording medium and an information reproduction apparatus for reproducing information from the recording medium.

30. A memory system according to claim 29, wherein the recording medium is formed of an optical disc.

31. A memory system according to claim 26, wherein said plurality of memories is formed of a plurality of recording areas provided on a single recording medium and a plurality of heads, respectively provided in correspondence with the plurality of recording areas, for reproducing information respectively recorded in each of the plurality of recording areas.

32. A memory system according to claim 31, wherein the recording medium is formed of the optical disc in which the plurality of recording areas is concentric.

33. A memory system according to claim 26, further comprising n memories (n representing an integer greater than 2) including at least the first memory and a second memory, wherein, if each unit of the data represents $a_i$, with a recording order corresponding to i, then $a_1\ a_{n+1},\ a_{2n+1}, \ldots$ are recorded in the first memory and $a_2,\ a_{n+2},\ a_{2n+2}, \ldots$ are recorded in the second memory.

34. A memory system according to claim 33, wherein, if each unit of the second data represents $b_i$, with a recording order corresponding to i, then $b_1\ b_{n+1},\ b_{2n+1}, \ldots$ are written to the first memory via said cross bar switch from the second input-output passage and $b_2,\ b_{n+2},\ b_{2n+2}, \ldots$ are written in the second memory via the cross bar switch from the second input-output passage.

* * * * *

UNITED STATES PATENT AND TRADEMARK OFFICE
CERTIFICATE OF CORRECTION

PATENT NO. : 6,169,845 B1
DATED : January 2, 2001
INVENTOR(S) : Mitsuru Yamamoto It is certified that error appears in the above-identified patent and that said Letters Patent is hereby corrected as shown below:

Title page,
Item [56] REFERENCES CITED
Foreign Patent Documents insert: -- 5778639 Sakamoto --.

Column 1,
Line 40, "65 the" should read -- 65 of the --.

Column 2,
Line 54, "and" should be deleted.

Column 6,
Line 11, "a1" should read -- $a_1$ --.

Column 7,
Line 22, "a" should read -- an --.
Line 25, "$a_1$" should read -- $a_1$, --.

Column 8,
Line 8, "$a_1$" should read -- $a_1$, --.
Line 55, "$a_1$" should read -- $a_1$ --.
Line 60, "$b_1$" should read -- $b_1$, --.
Line 61, "fist" should read -- first --.

Column 10,
Line 18, "$a_1$" should read -- $a_1$, --.
Line 23, "$b_1$" should read -- $b_1$, --.

Signed and Sealed this

Sixteenth Day of October, 2001

*Attest:*

NICHOLAS P. GODICI
*Attesting Officer*  *Acting Director of the United States Patent and Trademark Office*